United States Patent [19]
Neely et al.

[11] Patent Number: 5,213,416
[45] Date of Patent: May 25, 1993

[54] ON CHIP NOISE TOLERANT TEMPERATURE SENSING CIRCUIT

[75] Inventors: Andrew Neely, Phoenixville; Richard L. Fussell, Berwyn, both of Pa.

[73] Assignee: Unisys Corporation, Blue Bell, Pa.

[21] Appl. No.: 806,514

[22] Filed: Dec. 13, 1991

[51] Int. Cl.$^5$ .............................................. G01K 7/00
[52] U.S. Cl. ...................................... 374/178; 307/310
[58] Field of Search ............... 374/172, 173, 175, 178; 307/310, 315

[56] References Cited

U.S. PATENT DOCUMENTS

| | | | |
|---|---|---|---|
| 3,219,843 | 11/1965 | Follett | 374/178 |
| 3,535,561 | 10/1970 | Pinckaers | 307/310 |
| 3,582,688 | 6/1971 | Hilbert | 307/315 |
| 3,851,241 | 11/1974 | Wheatley, Jr. | 307/310 |
| 4,004,462 | 1/1977 | Dobkin | 374/173 |
| 4,071,813 | 1/1978 | Dobkin | 374/178 |
| 4,497,586 | 2/1985 | Nelson | 374/178 |
| 4,924,212 | 5/1990 | Fruhauf et al. | 307/310 |

FOREIGN PATENT DOCUMENTS

53-12373  3/1978  Japan ................................ 374/178
2034480  6/1980  United Kingdom ................ 374/178

Primary Examiner—William A. Cuchlinski, Jr.
Assistant Examiner—G. Bradley Bennett
Attorney, Agent, or Firm—John B. Sowell; Mark T. Starr

[57] ABSTRACT

A novel on-chip temperature sensing circuit includes a differential voltage source which comprises a plurality of branches each of which is provided with temperature sensitive transistor means. The differential output from the differential voltage source is coupled to the inputs of a high gain differential amplifier and the outputs from the high gain differential amplifier are connected to a second stage differential amplifer and one of the branches of the second stage differential amplifier is coupled to a high gain transistor amplifier which is connected to an output pin on the semiconductor chip so that the signal at the output pin is a noise tolerant voltage indication of the temperature of said semiconductor chip which may be monitored during actual online operations. A hysteresis feedback may be coupled between one of the outputs of the differential amplifiers to provide a hysteresis feedback loop and rapid switching of the second differential amplifier.

17 Claims, 5 Drawing Sheets

ON CHIP NOISE TOLERANT TEMPERATURE SENSING CIRCUIT

BACKGROUND OF THE INVENTION

1. Field of the Invention

The present invention is related to a noise tolerant temperature sensing circuit which is designed for high speed integrated circuits. More particularly, the present invention provides a temperature sensing circuit that is virtually insensitive to noise in either an analog or digital mode of operation and which provides a very high sensitivity for monitoring temperature or creating critical threshold switching points.

2. Description of the Prior Art

Heretofore, temperature sensing circuits have been placed on integrated circuits. These circuits typically consist of single thermal diodes, zener-diodes, temperature sensing transistors or resistors, all of which are sensitive to noise. In large integration circuits such as gate arrays the noise is so great that accurate temperature sensing can only be accomplished in an inactive state. Any attempt to sense temperature in an active state employing single ended (single output) temperature sensors is virtually impossible.

Typical of such single ended devices are thermal diodes placed on Unisys Corporation A-16 mainframe computer gate arrays used to test individual semiconductor devices at the component state before being incorporated into mainframe computers.

U.S. Pat. No. 4,924,212 shows and describes a temperature sensor which may be incorporated into a VLSI MOS chip to be used in an idle state test. This sensor comprises a reverse saturation stack of two transistors coupled to a voltage threshold comparator circuit.

U.S. Pat. No. 4,970,497 shows and describes a stack of MOS transistors greater than two which are employed as a resistor stack having a voltage output proportional to the temperature being sensed.

U.S. Pat. No. 4,733,162 shows and describes a single ended temperature sensor comprising a multiple emitter transistor that generates an output current which is proportional to temperature.

All of the above prior art circuits are sensitive to noise and as such would not be operable to sense the temperature of a VSLI chip during an on-line operation of a mainframe computer thus, are incapable of being monitored in an active state to determine trouble before a failure. Such circuits would not be useable for on-line computing operations to detect abnormal die temperature conditions and provide a warning before degradation or damage occurs.

It would be desirable to provide an on-chip temperature sensing circuit for high-speed VLSI chips which is capable of producing analog and/or digital signals to drive an off chip maintenance and monitoring device so as to detect problems before they arise and permit proper maintenance operation.

SUMMARY OF THE INVENTION

It is the primary object of the present invention to provide an on-chip temperature sensing circuit for digital logical circuits.

It is another primary object of the present invention to provide an on-chip temperature sensing circuit for high speed digital gate arrays that is virtually insensitive to noise in either an analog or digital mode of operation.

It is another principle object of the present invention to provide an novel high speed on-chip temperature sensing circuit capable of monitoring temperatures during actual online operations so that any logic chip may be identified as overheating and replaced before it becomes critical and costly damage occurs.

It is another principle object of the present invention to provide a novel high speed on-chip temperature sensing circuit which requires only one or two cells in a gate array having in excess of 10,000 cells and only occupies one output pin and may be used with any linear integrated circuit.

It is another object of the present invention to provide a novel high speed on-chip temperature sensing circuit that has a very high sensitivity output voltage.

It is another object of the present invention to provide a novel high speed on-chip temperature sensing circuit that has a linear output over a large desirable range of temperatures.

It is another object of the present invention to provide a novel high speed on-chip temperature sensing circuit that permits changing the ranges of temperatures to be sensed to provide maximum sensitivity over a desired range of temperature operations.

It is the object of the present invention to provide a novel high speed on-chip temperature sensing circuit having an output which is compatible with ECL input and output circuits for ease of routing.

It is the general object of the present invention to provide a novel on-chip temperature sensing circuit for VSLI implementation that employs resistors that do not adversely affect the switch point voltage of the sensing circuits.

It is another general object of the present invention to provide a novel on-chip temperature sensing circuit that maintains the accuracy of a pre-determined threshold even though the current deviation in the branches of the differential voltage source may vary.

It is another general object of the present invention to provide a novel temperature sensing circuit in which the novel circuit is flexible to design parameters so as to permit maximum insensitivity to current change in the two branches of a differential voltage source.

DESCRIPTION OF THE PREFERRED EMBODIMENT

Figure 1:
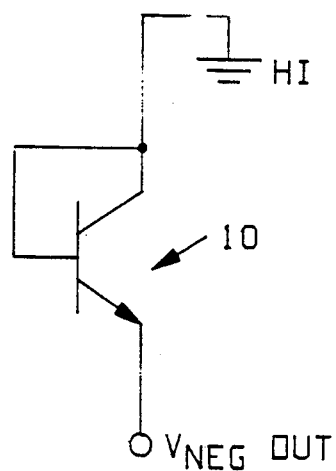
FIG. 1 is a schematic diagram of a prior art diode connected transistor of the type presently used on gate arrays to monitor temperature changes in an inactive state.

Refer now to FIG. 1 showing a single transistor 10 in a diode connected circuit configuration. The transistor shown is typical of a Motorola MCA3 gate array temperature sensing transistor which is connected at its collector to ground and has its emitter connected to a negative voltage output which is connected to an off-chip constant current sink. By pulling a constant current through the transistor 10 and monitoring the negative voltage at the pin, the temperature can be monitored as a function of the base-emitter voltage change. This temperature sensitive transistor may be used to test individual components in an static state but is not capable of monitoring temperature in a device with actively switching logic and is clearly not noise free.

Figure 2:
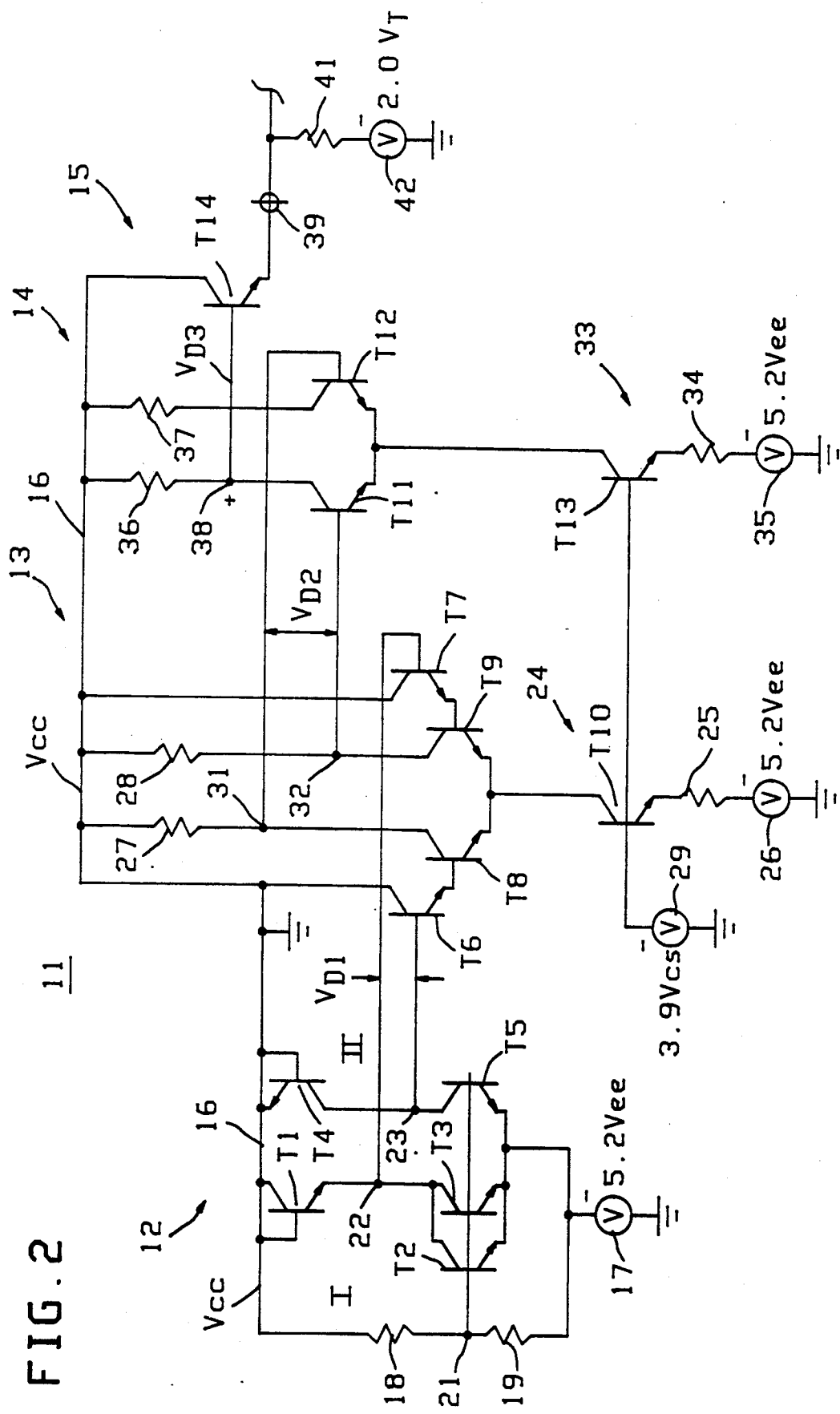
FIG. 2 is a schematic circuit diagram of a preferred embodiment of the present invention noise free analog temperature sensing circuit.

Refer now to FIG. 2 showing a schematic circuit diagram of a preferred embodiment of the present invention. The novel temperature sensing circuit 11 comprises a differential voltage source (DVS)12 which is coupled to the input of a first differential amplifier 13 having an output or outputs which are coupled to the input of a second differential amplifier 14 having one of it's output stages coupled to the input of a high current output amplifier 15.

(DVS)12 is shown comprising transistor T1 coupled to the collector voltage source (Vcc) 16 (shown as ground). The emitter of the transistor T1 is connected in series to the collectors of transistors T2 and T3 which have their emitters connected to a low voltage source 17 (shown as 5.2 volts). The negative voltage source 17 is connected to ground. A voltage divider comprising resistors 18 and 19 is shown connected between VCC 16 and the −5.2 voltage source 17. The base of transistors T2 and T3 is shown connected to the node 21 between the voltage dividers comprising resistors 18, 19. Transistors T1 to T3 comprise a series branch of the differential voltage source 12. The second branch of the DVS comprises transistors T4 and T5 connected in series between Vcc and the negative voltage source 17. The base of the transistors T1 and T4 are connected to the Vcc voltage 16 and the base of transistors T2, T3 and T5 are connected to the node point 21 between the voltage divider resistors 18, 19.

DVS 12 is shown have two output nodes 22 and 23 which are in the constant current branch lines of the DVS. Nodes 22 and 23 are shown being respectively connected to the bases of the transistors T6 and T7 which comprise the transistors of a Darlington pair of the first differential amplifier 13. Differential amplifier 13 comprises a Darlington pair T6 and T8 and a second Darlington pair T7 and T9 which are conventionally coupled between Vcc at bus 16 and a current source 24. Current source 24 comprises transistor T10, resistor 25 and low voltage source 26 shown having a −5.2 Vee voltage. The first and second branches of the differential amplifier 13 are provided with collector resistors 27 and 28 in series with transistors T8 and T9 respectively. The base of the source transistor T10 is coupled to a constant voltage source 29 (shown as $V_{cs}$ having −3.9 volts). In the preferred mode of analog operation, temperature sensitive transistors T1 and T4 provide a differential voltage $V_{D1}$ across nodes 22 and 23 which is applied to the base of the Darlington pair transistors of T6 and T7 to produce an output voltage $V_{D2}$ across the nodes 31 and 32 of the branches of the differential amplifier 13.

The differential voltage $V_{D2}$ at the nodes 31 and 32 is applied to the base of transistors T11 and T12 of the second differential amplifier 14 which is is conventionally coupled in series between Vcc at bus 16 and a constant current source 33 comprising transistor T13, resistor 34 and a low voltage source 35 (shown having a −5.2 volt emitter voltage). The first and second branches of the second differential amplifier 14 are provided with collector resistors 36 and 37 in series with transistors with T11 and T12 respectively. The base of current source transistor T13 is coupled to the constant voltage source 29.

In the preferred embodiment, an analog voltage $V_{D3}$ is generated at node 38 from one of the two branches of the second differential amplifier 14 and it is applied to the base of a high current amplifier transistor T14. The differential voltage available across resistors 36 and 37 need not be employed as will be explained hereinafter, because the output at node 38 produces an analog voltage which is proportional to the change in temperature of the substrate on which the transistors T1 and T4 are made. The voltage output from the emitter of transistor T14 is connected to a single ended output pin 39 where it may be utilized by various forms of termination circuits. In the preferred embodiment of the present invention the output pin 39 is connected through a resistor 41 and a terminating voltage 42 (shown as $V_T$ having a −2.0 voltage). This terminating voltage is compatible with ECL routing and may be directly coupled to a maintenance controller or any voltage sensor. A preferred embodiment sensor would be a analog to digital converter so that the information may be monitered instantly in the maintenance controller for maintenance purposes.

As explained herein before, the feature of the present invention resides in the novel differential voltage source (DVS)12. A preferred embodiment DVS comprises a matched pair of transistors T1 and T4 connected to bus 16 as a base emitter diode and a base collecter diode T4 having different biasing currents. The difference in biasing currents between the transistors T1 and T4 permits the DVS 12 to control or drive the differential amplifier 13 in a switching mode, thus, providing high common mode noise rejection as well as high gain. The DVS configuration shown provides an output at pin 39 having 30 millivolts per degree centigrade in the selected switching band which for purposes of the present invention will be shown as occurring between 75 and 100 degree centigrade. However, it will be appreciated that the available design parameters will permit changing the selected switching band to other temperature ranges while maintaining the high voltage to temperature coefficient. The high temperature coefficient will eliminate any resolution problems, will permit accurate adjustment and also eliminate the effect of switching noise which is generated on the logic circuit or gate array when it is being used in its operating switching mode.

It will be recognized that the current at node 22 and node 23 are assumed to be constant currents and that the voltage across the base emitter junction of transistor T1 and the base collector junction of transistor T4 changes at different rates with changes in temperature. The current into node 22 may be approximated as $I22 = I_s e^{V_{BE}/V_T}$ and that the current into node 23 is defined as $I23 = I_s e^{V_{BC}/V_T}$. The first branch of the differential voltage source 12 is provided with parallel transistors T2 and T3 which causes the current in the first branch to be greater than the current in the second branch at node 23. Since the current is higher in the branch one at node 22, the transistor T1 changes voltage at a greater rate than transistor T4. In the above formula the thermal voltage $V_T$ is equal to KT/q where K is equal to Boltzman's constant and the temperature T is in degrees Kelvin and q is the negative electron charge.

Initially the base collector voltage across transistor T4 is greater than the base emitter voltage across transistor T1. As the temperature increases, the voltage drop across the base emitter junction of transistor T1 increases faster than the voltage drop across the base collector junction of transistor T4 causing a switch over point to occur, thus allowing DVS 12 to generate a differential voltage $V_{D1}$ across the nodes 22 and 23 which draws a very minimal amount of current but is sufficient to control the differential amplifier 13 which produces a very high gain.

It will be appreciated that the number of transistors (T2 and T3) in branch one (I) of the DVS may be increased as well as the number of transistors in the second branch (II) of the DVS so long as the number of identical transistors in branch one exceeds the number of transistors in branch two by at least one.

Transistors T2, T3 and T5, resistors 18 and 19 and voltage source 17 comprise a constant current source. The ratio of the number of transistors in branch one of DVS 12 to the number of transistors in branch two of the DVS 12 determines the ratio of current in the two branches for design purposes. Further, this ratio determines the slope of the temperature voltage transfer curve as will be explained hereinafter. The ratio of the resistors 18 and 19 determines the base emitter voltage of T2, T3, and T5. This base emitter voltage sets the operating current which can be adjusted to select the crossover point.

Figure 3:
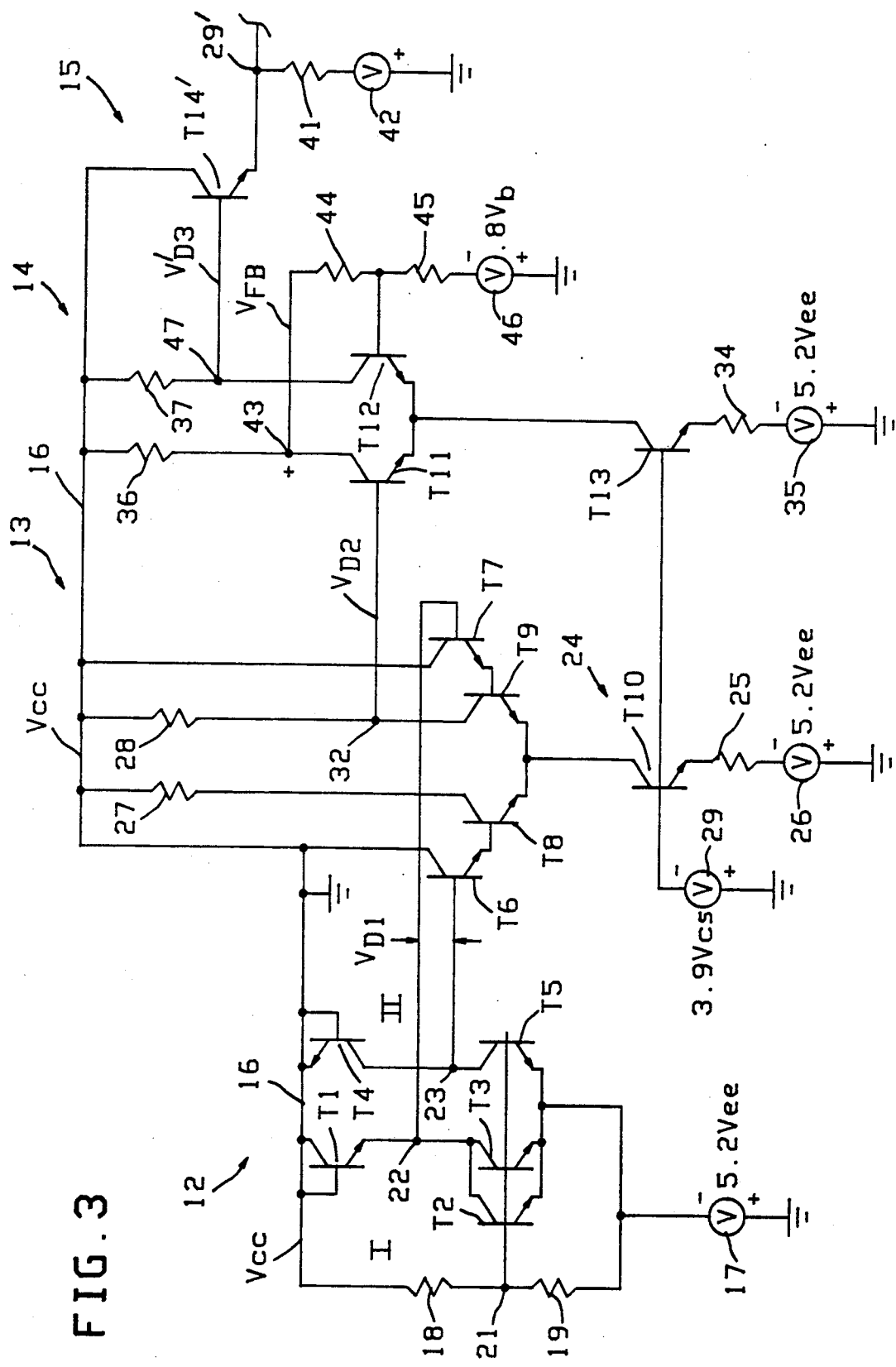
FIG. 3 is a schematic circuit diagram of another preferred embodiment of the present invention digital temperature sensing circuit.

Refer now to FIG. 3, showing a schematic circuit diagram of a preferred embodiment of the present invention noise free digital sensing circuit. For purposes of explanation of FIG. 3 all of the elements and components which are identical to and operate the same as those described herein with reference to FIG. 2 have been numbered the same. It will be noted that the node 31 which previously connected to the base of the transistor T12 has been removed and the positive going branch of the second differential amplifier 14 is provided with a node 43 which is connected in a positive feedback mode through a voltage divider, comprising resistors 44 and 45, to the base of transistor T12. The voltage divider is also connected to a voltage source 46 (shown as Vb having voltage 0.8 volts). It will be noted that the node 38, which was previously connected to the base of transistor T14, is now connected to the second or negative branch at node 47 to the base of the high current amplifier transistor T14. Employing the digital circuitry of FIG. 3, the output at node 29' is switching compatible and routing compatible with standard ECL circuits. If it is desired to drive a utilization device other than an ECL input circuit, proper modification of resistor 41 and termination voltage source 42 will accomplish this easily.

Figure 4:
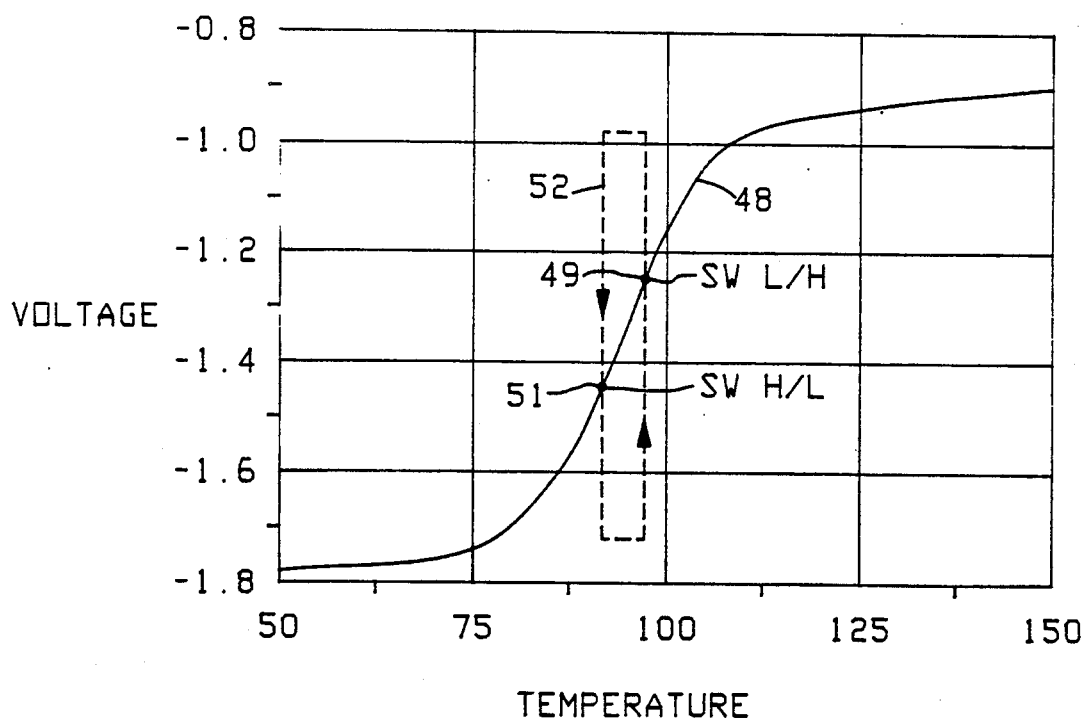
FIG. 4 is a schematic voltage vs. temperature waveform diagram.

Refer now to FIG. 4 showing a voltage versus temperature transfer characteristic waveform diagram in which the differential voltage source 12 resistors and elements have been adjusted to produce a transfer range between the temperatures of approximately 75 and 110 degrees C. It will be noted that the linear portion of the curve 48 occurs between approximately −1.0 and −1.7 volts. This linear portion of the curve 48 permits direct conversion of the analog voltage through an analog to digital converter to temperature which simplifies using this information in a maintenance controller. Further, in the digital sensing curcuit shown in FIG. 3, the low to high switching point 49 and the high to low switching point 51 have been superimposed on the waveform 48 along with the hysteresis loop 52 shown in phantom lines to illustrate the compatibility of either analog or digital versions of the sensing circuit. Further, the waveform 48 is the signal produced by taking the positive-going signal at node 38 of FIG. 2 rather than the negative waveform which would be generated by taking the signal at node 47 of FIG. 3. The reason for connecting node 47 to the second and negative branch of the second differential amplifier 14 is to avoid drawing excessive current from one of the two branches. The feedback voltage from node 43 of FIG. 3 provides an offset between the positive and negative switching points which prevents oscillation as is well known in this art.

Figure 5:
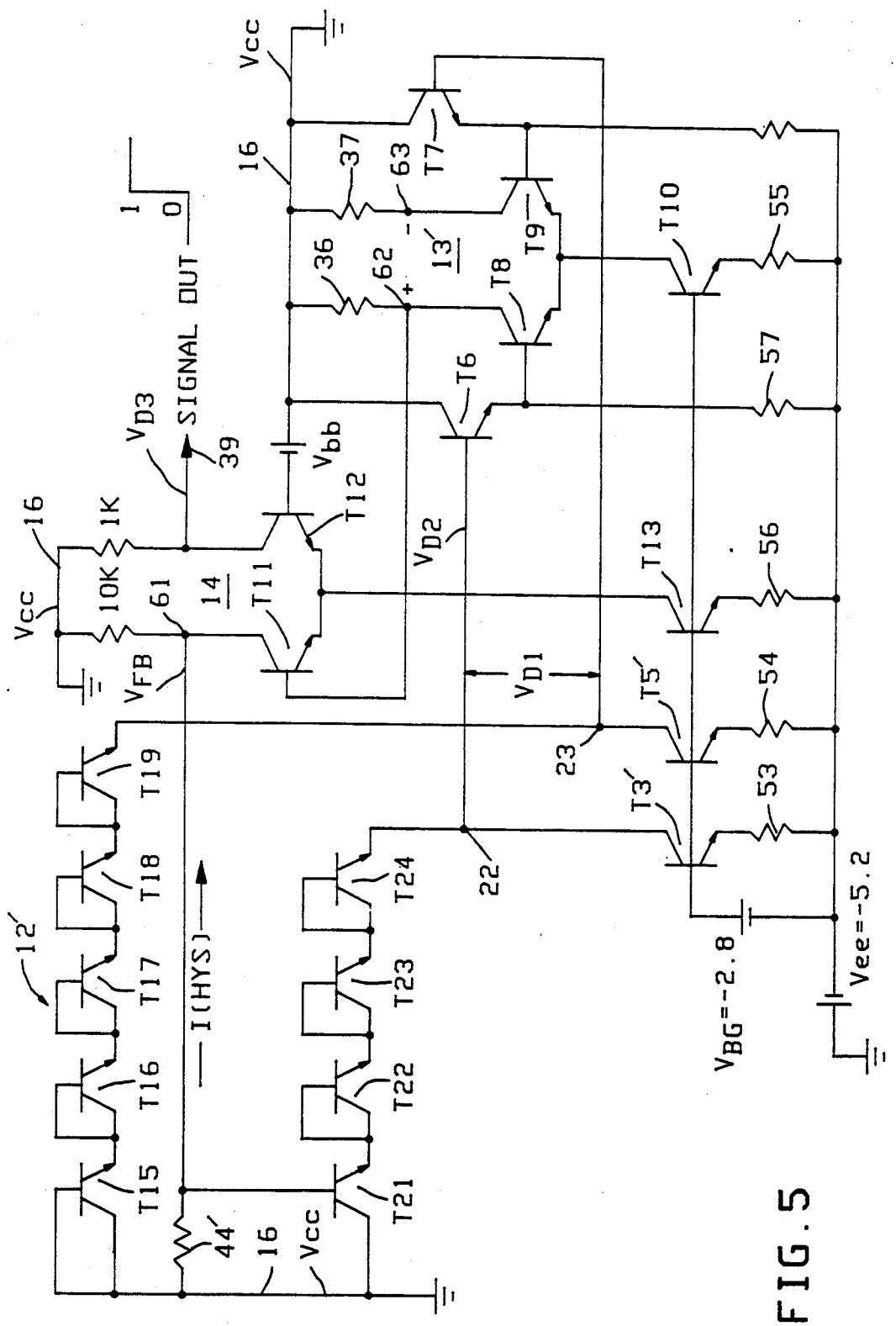
FIG. 5 is a schematic circuit diagram of yet another preferred embodiment noise free digital temperature sensing circuit.

Refer now to FIG. 5 showing a schematic circuit diagram of another preferred embodiment digital temperature sensing curcuit. The FIG. 5 temperature sensing circuit also comprises a differential voltage source 12', a first differential amplifier 13, shown as a Darlington amplifier, and a second differential amplifier 14 which produces an output from its negative or second branch to an output pin 39 which may be coupled to an emitter coupled follower transistor T14, as shown in FIGS. 2 and 3.

The feature of the FIG. 5 temperature sensing circuit resides mainly in the modified differential voltage source and its ability to provide a much higher signal to the differential switch. In fact the amplified signal produced in the DVS 12' under most circumstances is sufficient that it may be used in one stage of amplification rather than the two stages of differential amplifier amplification shown in FIGS. 2 and 3. The Vcc voltage on line 16 is shown connected to a series stack of transistors T15 to T19. Transistors T15 to T19 have their bases connected to the collectors to provide thermal diodes having their output connected to node 22. In similar manner, the Vcc voltage is connected to a second high-current branch stack of transistors T21 to T24. The output of the second and high-current stack of transistors T21 to T24 is connected to a transistor T3' and a current source path resistor 53. The output of the low-current branch of transistors T15 to T19 is connected to the node 23 and transistor T5 through a current source path resistor 54. The value of the resistor 54 is preferably a predetermined multiple of the value of the resistor 53, as will be explained hereinafter.

The voltage produced across nodes 22 and 23 is shown as the voltage $V_{D1}$ and is similar to the voltage produced in FIGS. 2 and 3. The differential voltage across nodes 22 and 23 is connected to the base electrodes of transistors T6 and T7 respectively of the Darlington pair differential amplifier 13' which is connected between the Vcc voltage at line 16 and a constant current source comprising transistor T10 and resistor 55. The output at node 62 of the first and positive branch from differential amplifier 13', shown as $V_{D2}$, is applied to the base electrode of transistor T11 of the second differential amplifier 14'. Differential amplifier 14' is coupled between the Vcc voltage on line 16 and a constant current source comprising transistor T13 and resistor 56. A resistor 57 is shown connected to the emitter of transistor T6 of the differential amplifier 13' and forms a high temperature leakage path for protection of the differential amplifier. The same resistor may be included in the other differential amplifiers for protection purposes. The FIG. 5 embodiment enjoys the feature of having a much higher signal to noise ratio output across nodes 22 and 23 than the previously described temperature sensing circuits. Assume that the number of transistors in the first or high current branch having transistors T21 through T24, has n number of transistors, then the number of transistors in the low current or second branch having transistors T15 to T19 will have n+1 transistors. This assumes that branch one will always include a minimum of two transistors. By selecting the optimum number of transistors n for the sensing circuit it is possible to move the S curve 48 shown in FIG. 4 or hysteresis loop 52 shown in FIG. 4 vertically upwards or downwards in the vertical voltage range. Similarly, it is possible to select the optimum temperature range for the linear portion of waveform 48 by changing the ratio of the value of the resistors 53 and 54, as will be explained hereinafter.

Figure 6:
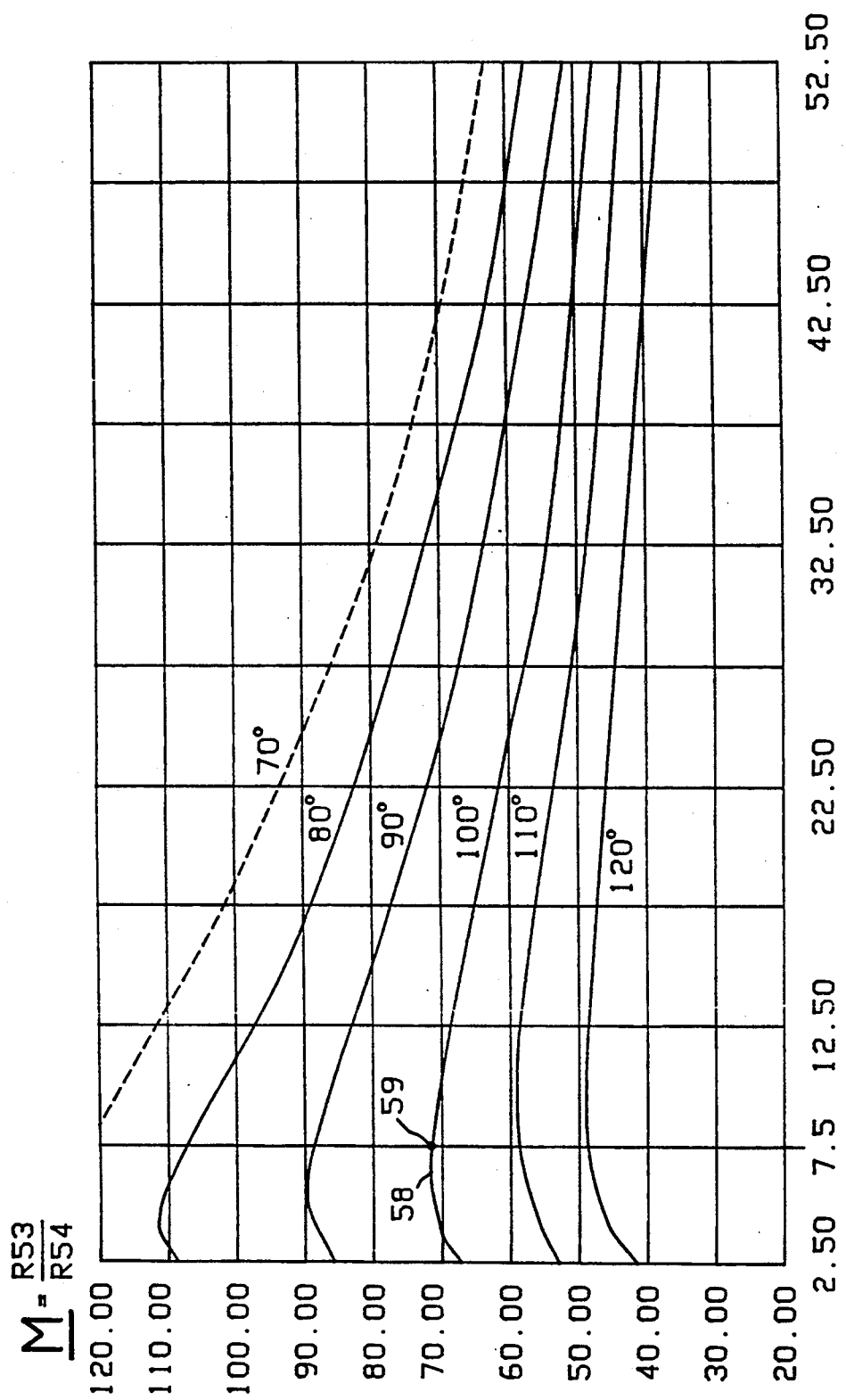
FIG. 6 is a schematic waveform diagram of the current ratio in one of the branches of the differential voltage source for the circuit shown in FIG. 5.

Refer now to FIG. 6 showing a schematic waveform diagram of the current ratio in one of the branches of the differential voltage source 12' shown in FIG. 5. The abscissa current I23 is in microampere units and the ordinate is a dimensionless number M equal to the current ratio of the I22 over I23. It is possible to select a temperature curve such as curve 58 for 100 degrees C. and enter the current value at 7.5 microamps and determine that the ratio 72 for M will produce a point 59 on curve 58 at which minor variations in the value of the resistors 53 and 54 of up to 25% have less than 2% affect on the differential voltage output across the nodes 22, 23 shown as $V_{D1}$. Further, as explained hereinbefore, it is possible to move the point 59 to a high current range by adjusting transistor parameters, selecting transistor ratios and/or types of transistors to achieve a higher current at the node 23. Thus, it is possible to achieve a much higher differential signal to noise ratio across nodes 22 and 23 than in the previously explained embodiments. By selecting a high signal to noise ratio it is possible that the second differential amplifier 14' shown in FIG. 5, may be completely eliminated. Thus the feedback voltage path shown at node 61 which produced the $V_{FB}$ voltage across the hysteresis resistor 44 may be moved to the positive branch of the first differential amplifier shown as node 62.

When this embodiment is employed, the output signal to the pin 39 would be taken from the second or negative branch of the first differential amplifier shown as node 63.

Having explained a preferred embodiment of the present invention and two modifications thereof showing both analog and digital format forms, it will now be appreciated that the feature of the present invention resides around the differential voltage source which produces a higher signal to noise ratio or high voltage temperature coefficient output than circuits employed theretofore. Further, it will be appreciated that any of the previously described differential voltage sources, 12 or 12', may be coupled to any of the previously described curcuits using one or two differential amplifiers in the output to provide an output signal that is minimally affected by noise.

The advantage of the present invention is that the differential voltage source, 12 or 12', when placed on a very high speed logic circuit, such as an ECL gate array, is subject to a great amount of noise produced by switching of logic transistors and/or the bounce or movement of Vcc voltage shown as ground. This noise is so great in a high speed logic circuit that it would be impossible to use prior temperature sensing circuits and produce a useful output when the logic circuit was in an operating condition. In this regard it will be noted that the hysteresis resistor 44' is fed back from the node 61 from the first branch of the second differential amplifier 14 prime back to the Vcc voltage 16 which is subject to noise variations. By feeding the hysteresis signal back to the original source of the noise and occillation, it is possible to calculate more accurately the requirement for the feedback resistor 44' and the amount of hysteresis necessary to dampen the occillations from this circuit.

What is claimed is:

1. An on-chip temperature sensing circuit for semiconductor devices, comprising:
   a differential voltage source (DVS) having first and second branches,
   each of said branches having thermal sensitive transistor means therein connected in series with a current source,
   said thermal sensitive transistor means in said first and second branches comprising a base-collector transistor in said first branch of said DVS and a base-emitter transistor in said second branch of said DVS having different voltage output rates of change with temperature at their branch output nodes,
   amplifier means coupled to the output nodes of said first and second branches of said DVS,
   means for generating an on-chip voltage signal at an output electrode of said chip which is tolerant to switching noise and provides a voltage signal indicative of the temperature of said chip.

2. An on-chip temperature sensing circuit for semiconductor devices, comprising:
   a differential voltage source (DVS) having first and second branches,
   each of said branches having thermal sensitive transistor means therein connected in series with a current source,
   said thermal sensitive transistor means in said first and second branches having different voltage output rates of change with temperature at their branch output nodes,
   amplifier means coupled to the output nodes of said first and second branches of said DVS,
   said amplifier means comprises a first and a second differential amplifier connected in series,
   each said differential amplifier having a first and a second output branch coupled in series with a current source,
   said second differential amplifier having one of its output branches coupled to provide a high gain output,
   means for generating an on-chip voltage signal at an output electrode of said chip which is tolerant to switching noise and provides a voltage signal indicative of the temperature of said chip.

3. An on-chip temperature sensing circuit as set forth in claim 2 wherein said first differential amplifier comprises a Darlington pair differential amplifier.

4. An on-chip temperature sensing circuit as set forth in claim 1
   wherein the voltage rate of change with temperature of said base-collector transistor is greater than the voltage rate of change with temperature across the base-emitter transistor.

5. An on-chip temperature sensing circuit as set forth in claim 4 wherein said thermal sensitive transistor means comprises a parallel stack of transistors in at least one branch of DVS in series with one of said thermal sensitive transistors.

6. An on-chip temperature sensing circuit as set forth in claim 2 wherein said thermal sensitive transistor means comprises series connected stacks of transistors in said branches of said DVS.

7. An on-chip temperature sensing circuit as set forth in claim 2 which further includes feedback coupling means connected between one output branch of one said differential amplifier and the base of the transistor amplifier in a branch of the other differential amplifier for generating a hysteresis switching output from said amplifier means.

8. An on-chip temperature sensing circuit as set forth in claim 7 wherein said amplifier means comprises a differential amplifier having at least one pair of output branches coupled to the output of said first and second branches of said DVS.

9. An on-chip temperature sensing circuit as set forth in claim 8 in which further includes feedback coupling means connected between one output branch of said differential amplifier means and the branches of said DVS,
said feedback coupling means being connected directly to the base of the transistor in the top of one of the series stacks of transistors in a branch of said DVS, and
said feedback coupling means being connected through a low value resistor to the collectors of the transistors in the top of the series stacks of transistors in the branches of said DVS.

10. An on-chip temperature sensing circuit as set forth in claim 1 which further includes feedback coupling means connected between one output branch of said amplifier means and the voltage supply to said branches of said DVS for generating a hysteresis switching output from said amplifier means.

11. An on-chip temperature sensing circuit as set forth in claim 2 wherein said thermal sensitive transistors in said branches of said DVS comprise series stacks of transistors having their base and collector electrodes interconnected to form series stacks of transistor diodes.

12. An on-chip temperature sensing circuit as set forth in claim 11 which further includes feedback coupling means connected between one output branch of said amplifier means and the voltage supplied to the collector of the first transistor in said series stack of transistors in said branches of said DVS.

13. An on-chip temperature sensing circuit for semiconductor devices, comprising:
a differential voltage source (DVS) comprising a plurality of branches,
each of said branches of said DVS having thermal transistor means therein which provide different voltage rate of change outputs with temperature,
a first stage differential amplifier coupled to the output of said DVS branches and providing a differential voltage output,
a second stage differential amplifier coupled to the output of said first stage differential amplifier for providing an output signal which is tolerant to switching noise and is indicative of the temperature of said semiconductor device, and
each of said branches of said DVS being provided with a plurality of transistors,
said output of said plurality of transistors in said branches being coupled to the input of said first stage differential amplifier to provide said output proportional to changes in temperature of said semiconductor device,
said first stage and said second stage differential amplifier each having two branches and at least one of the output branches of said first stage differential amplifier being coupled to an input of said second stage amplifier means to provide hysteresis feedback.

14. An on-chip temperature sensing circuit as set forth in claim 13 wherein said first stage differential amplifier comprises a Darlington pair transistor differential amplifier having two output branches.

15. An on-chip temperature sensing circuit as set forth in claim 14 wherein said second stage differential amplifier comprises a differential amplifier having two branches and at least one of the output branches of said first stage differential amplifier is coupled to the input of said second stage amplifier means to provide hysteresis feedback.

16. An on-chip temperature sensing circuit as set forth in claim 13 wherein the output of said second stage amplifier means is coupled to the base of one of the thermal transistor means in one of the branches of said DVS to provide a hysteresis feedback loop signal and feedback for on-off switching.

17. An on-chip temperature sensing circuit as set forth in claim 13 wherein the output of said second branch of said first stage differential amplifier is in digital form indicative of a predetermined threshold temperature switching point of said second differential stage amplifier.

* * * * *